(12) United States Patent
Kunishi et al.

(10) Patent No.: US 8,419,113 B2
(45) Date of Patent: Apr. 16, 2013

(54) STRUCTURAL MEMBER FOR VEHICLE

(75) Inventors: Daichi Kunishi, Aichi-gun (JP); Takashi Ishihara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 58 days.

(21) Appl. No.: 13/124,714

(22) PCT Filed: Nov. 17, 2008

(86) PCT No.: PCT/JP2008/070875
§ 371 (c)(1),
(2), (4) Date: Apr. 18, 2011

(87) PCT Pub. No.: WO2010/055589
PCT Pub. Date: May 20, 2010

(65) Prior Publication Data
US 2011/0210581 A1 Sep. 1, 2011

(51) Int. Cl.
*B60N 99/00* (2006.01)
(52) U.S. Cl.
USPC .............................. 296/193.06; 296/187.12
(58) Field of Classification Search ............. 296/187.12, 296/193.06
See application file for complete search history.

(56) References Cited

U.S. PATENT DOCUMENTS

| 5,382,071 | A | * | 1/1995 | Enning et al. | 296/203.03 |
| 6,983,981 | B2 | | 1/2006 | Saeki | |
| 7,357,448 | B2 | * | 4/2008 | Chen et al. | 296/203.03 |
| 7,510,234 | B2 | * | 3/2009 | Ameloot et al. | 296/187.12 |
| 7,959,217 | B2 | * | 6/2011 | Onuma | 296/187.12 |

FOREIGN PATENT DOCUMENTS

| JP | U-6-27449 | 4/1994 |
| JP | A-08-011745 | 1/1996 |
| JP | A-2000-177631 | 6/2000 |
| JP | A-2008-189296 | 8/2008 |

OTHER PUBLICATIONS

International Preliminary Report on Patentability dated Jun. 30, 2011 in International Application No. PCT/JP2008/070875.
International Search Report dated Feb. 17, 2009 in corresponding International Application No. PCT/JP2008/070875 (with translation).

* cited by examiner

*Primary Examiner* — Lori Lyjak
(74) *Attorney, Agent, or Firm* — Oliff & Berridge, PLC

(57) ABSTRACT

Through holes 14, which passes through a side wall portion 12b of an outer reinforcement 12, is formed at a lower portion of a center pillar 1. The through hole 14 is formed substantially in a D shape, and includes a linear portion 14a and a circular arc portion 14b that is connected to both ends of the linear portion 14a. The length of the circular arc portion 14b is longer than that of the linear portion 14a. The linear portion 14a is disposed close to the inside of a vehicle, and the circular arc portion 14b is disposed close to the outside of a vehicle. If the circular arc portion 14b allows for deformation in length as described above, tensile stress is not easily applied to the circular arc portion when a load F is applied to the center pillar by a side collision. Accordingly, the fracturing of a center pillar 1 does not easily occur.

4 Claims, 5 Drawing Sheets

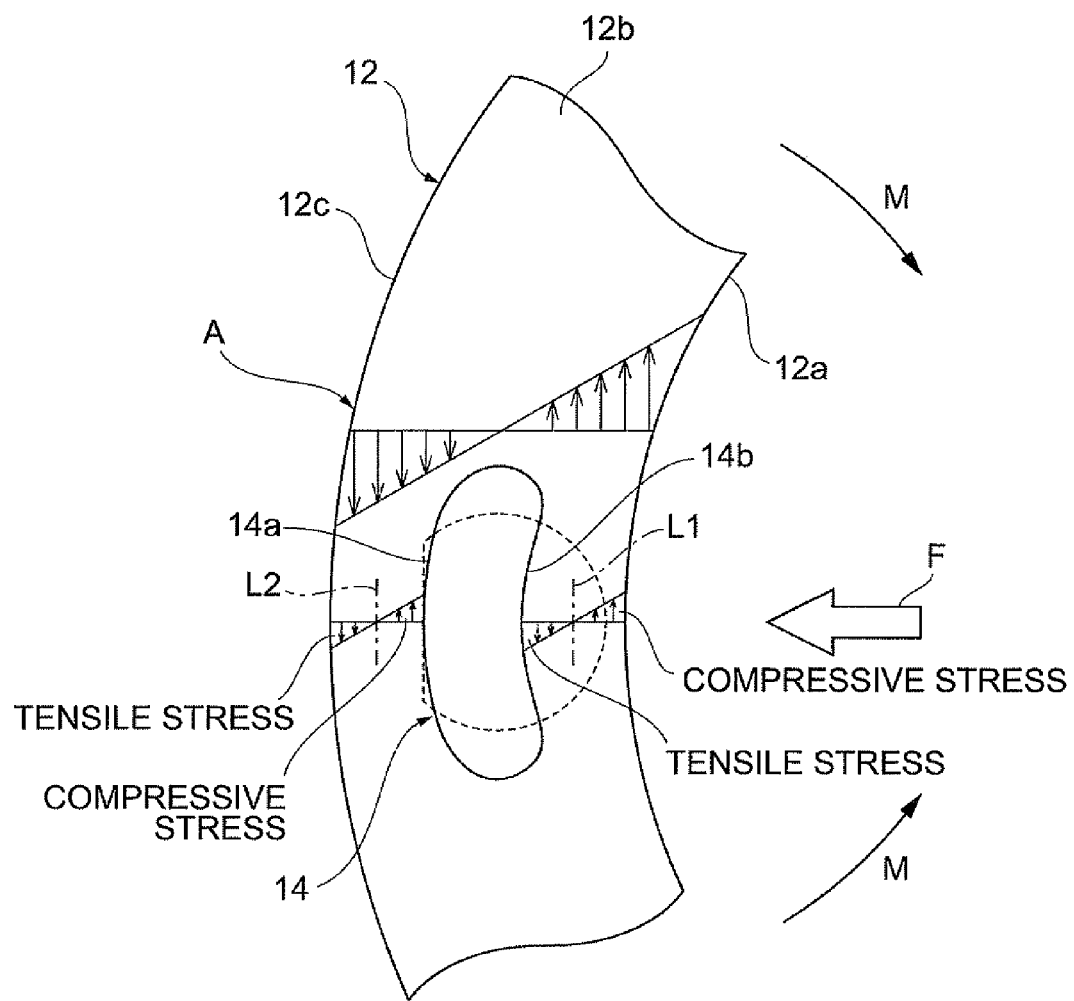

STRUCTURAL MEMBER FOR VEHICLE

TECHNICAL FIELD

The present invention relates to a structural member for a vehicle that is used in a vehicle body structure.

BACKGROUND ART

In the past, a center pillar, which includes a pillar outer including a vulnerable portion formed of through holes and a pillar inner including a curved portion as described in, for example, Japanese Unexamined Patent Application Publication No. 2008-189296, has been known as a structural member for a vehicle that is used in a vehicle body structure. By using the above-mentioned center pillar, the through holes are fractured and the curved portion is then elongated and generates tension when a side collision occurs. Accordingly, the impact load applied to an occupant is reduced.

CITATION LIST

Patent Literature

[Patent Literature 1] Japanese Unexamined Patent Application Publication No. 2008-189296

SUMMARY OF INVENTION

Technical Problem

However, in the related art concerning the center pillar, there has been insufficient examination of whether the through holes are suited to the input direction of a load, and thus there is a problem in that it is difficult to control the deformation mode of the member caused by a collision.

The invention has been made to solve the above-mentioned technical problem, and an object of the invention is to provide a structural member for a vehicle that can control the deformation mode.

Solution to Problem

According to the invention, there is provided a structural member for a vehicle including a vulnerable portion where through holes are formed. A tensile portion of the contour of the through hole, to which tensile stress is applied when a load is applied to the through hole, is longer than a compressive portion of the contour of the through hole to which compressive stress is applied when a load is applied to the through hole.

According to this invention, the tensile portion of the contour of the through hole, to which tensile stress is applied when a load is applied to the through hole, is longer than the compressive portion of the contour of the through hole to which compressive stress is applied when a load is applied to the through hole. Accordingly, the tensile portion allows for deformation. Since the tensile portion allows for deformation in length as described above, tensile stress is not easily applied to the tensile portion. Therefore, it may be possible to control the deformation mode of the member. Further, since tensile stress is not easily applied to the tensile portion, it may be possible to significantly reduce the compressive stress applied to the compressive portion. As a result, it may be possible to suppress the occurrence of the fracturing of the structural member for a vehicle.

In the structural member for a vehicle according to the invention, the compressive portion of the contour of the through hole may be formed in a linear shape and the tensile portion may be formed in a circular arc shape.

In this case, since the tensile portion is formed in a circular arc shape, the tensile portion may easily allow for deformation in length and tensile stress is not easily applied to the tensile portion.

Moreover, according to the invention, there is provided a structural member for a vehicle that is used in a vehicle body structure. The structural member comprise a vulnerable portion that includes a stretching portion or/and a shrinking portion according to the direction of the load to be input from the outside.

According to this invention, the vulnerable portion includes a stretching portion or/and a shrinking portion according to the direction of the load to be input from the outside. Accordingly, it may be possible to provide a vulnerable portion that is suited to the input direction of the load in consideration of the input direction of the load. Therefore, it may be possible to control the deformation mode of the member that is caused by the load input.

Advantageous Effects of Invention

According to the invention, it may be possible to provide a structural member for a vehicle that can control a deformation mode.

BRIEF DESCRIPTION OF DRAWINGS

FIG. 5 is a schematic view showing the deformation of the through hole that is caused by a collision load.

REFERENCE SIGNS LIST

1: center pillar (structural member for a vehicle)
14: through hole
14a: linear portion
14b: circular arc portion
A: vulnerable portion

DESCRIPTION OF EMBODIMENTS

An embodiment of the invention will be described in detail below with reference to the accompanying drawings.

Figure 1:
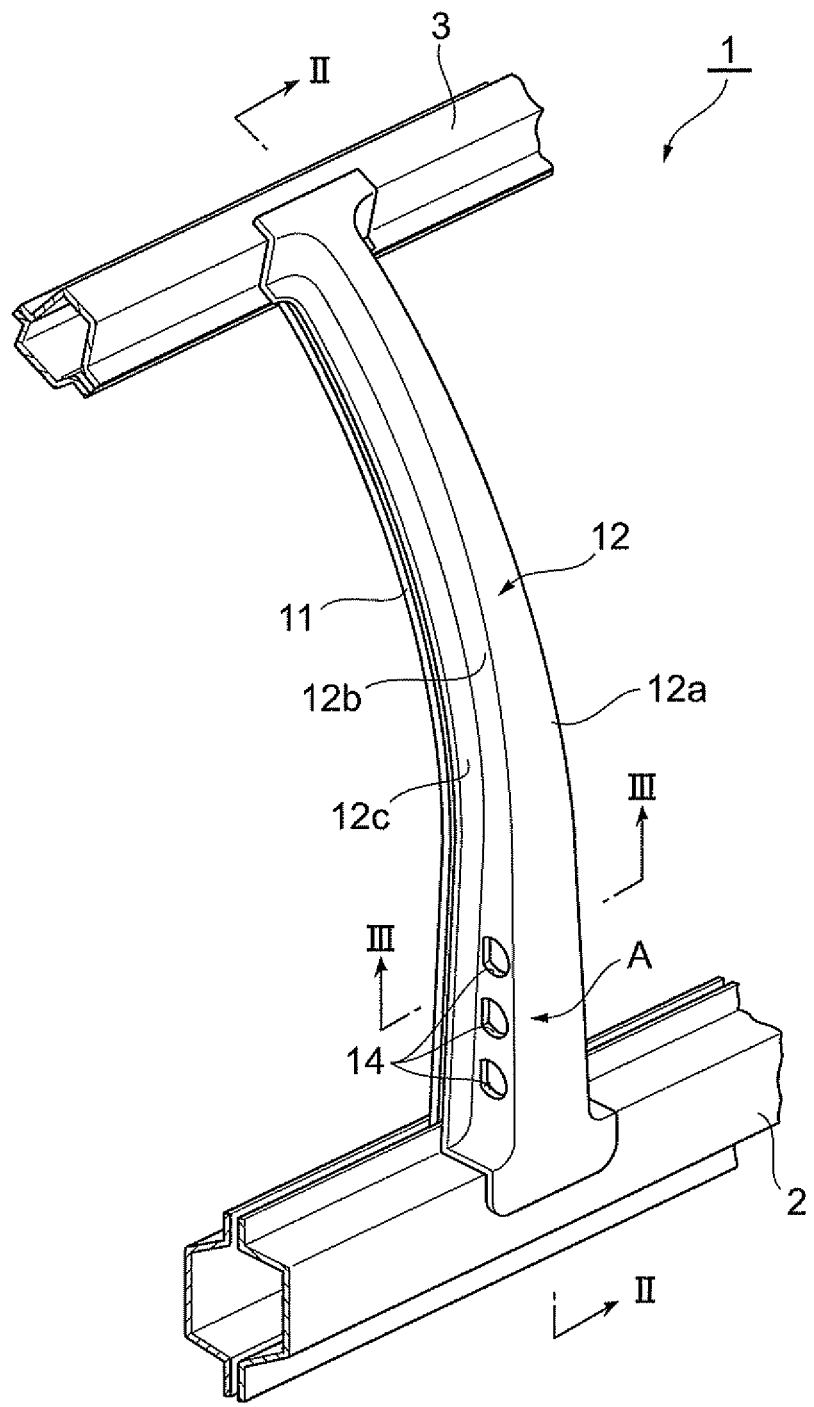
FIG. 1 is a perspective view of a center pillar.
Figure 2:
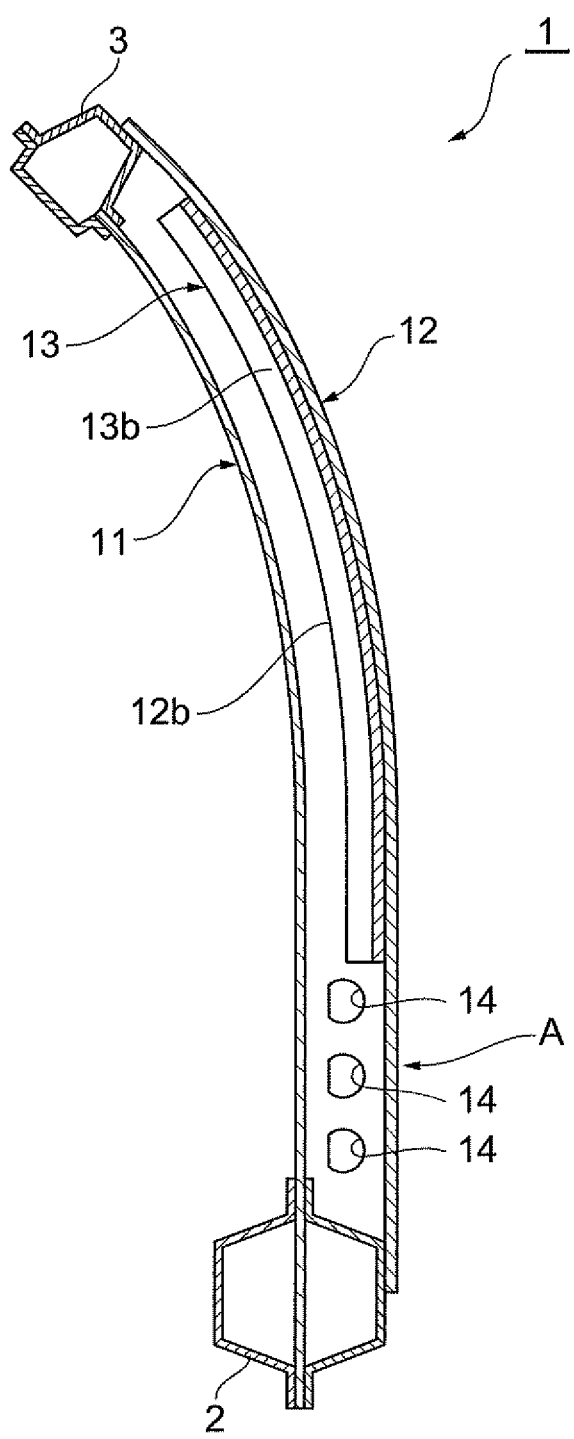
FIG. 2 is a sectional view taken along a line II-II of FIG. 1.
Figure 3:
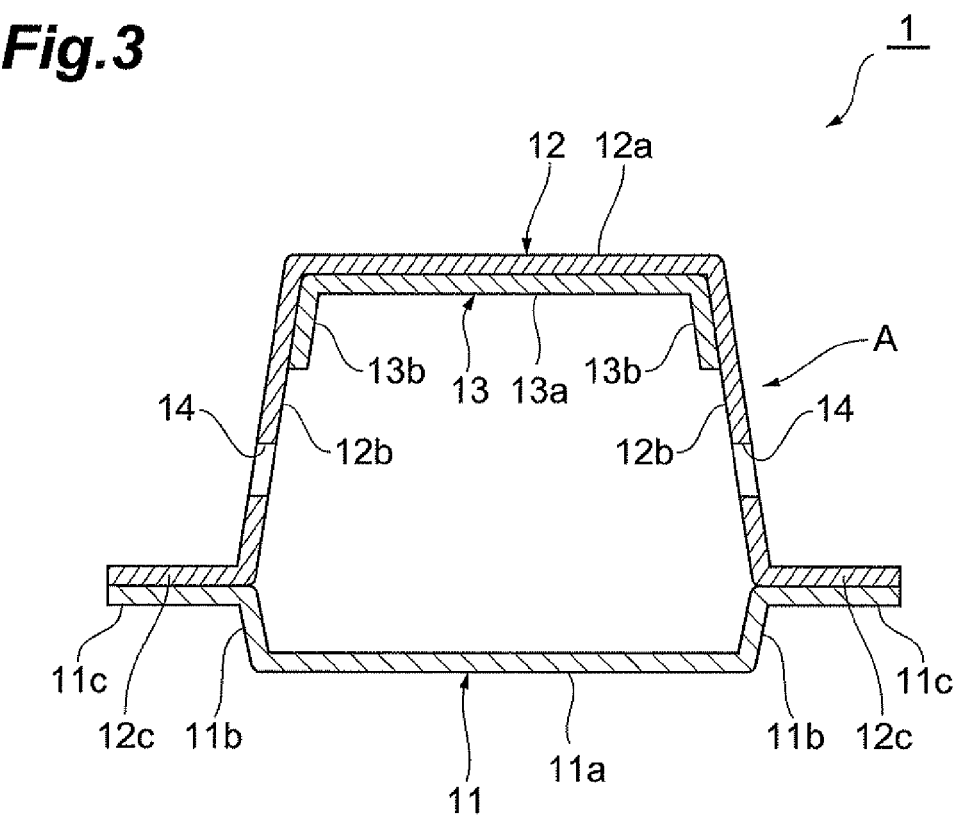
FIG. 3 is a sectional view taken along a line III-III of FIG. 1.

In this embodiment, a structural member for a vehicle according to the invention is applied to a center pillar that is disposed between front and rear doors, supports a roof, and increases the stiffness of a vehicle body. FIG. 1 is a perspective view of a center pillar, FIG. 2 is a sectional view taken along a line II-II of FIG. 1, and FIG. 3 is a sectional view taken along a line III-III of FIG. 1.

A center pillar 1 includes a pillar inner 11, an outer reinforcement 12, and a hinge reinforcement 13. All of the pillar inner 11, the outer reinforcement 12, and the hinge reinforcement 13 extend in a vertical direction.

The pillar inner 11 is disposed on the inside of a vehicle. The pillar inner 11 includes a flat portion 11a that forms the inner surface of the center pillar 1, a pair of side wall portions 11b and 11b that is connected to both ends of the flat portion 11a, and a pair of flange portions 11c and 11c that is connected to ends of the side wall portions 11*b* and 11*b*. The side wall portions 11*b* and 11*b* extend toward the outside of a vehicle from the inside of a vehicle. Further, the outer reinforcement 12 and the pillar inner 11 form a closed sectional structure, and form the appearance of the center pillar 1.

The outer reinforcement 12 is one of the outer reinforcing members of the center pillar 1. The outer reinforcement 12 includes a flat portion 12*a*, a pair of side wall portions 12*b* and 12*b* that is connected to both ends of the flat portion 12*a*, and a pair of flange portions 12*c* and 12*c* that is connected to ends of the side wall portions 12*b* and 12*b*. The side wall portions 12*b* and 12*b* extend toward the inside of a vehicle from the outside of a vehicle.

The hinge reinforcement 13 is one of the outer reinforcing members of the center pillar 1. The hinge reinforcement 13 is disposed on the inside of the outer reinforcement 12. The hinge reinforcement 13 includes a flat portion 13*a* that is joined to the flat portion 12*a* of the outer reinforcement 12, and a pair of side wall portions 13*b* and 13*b* that is connected to both ends of the flat portion 13*a*. Each of the side wall portions 13*b* and 13*b* are formed to be shorter than the side wall portion 12*b* of the outer reinforcement 12.

When the center pillar 1 is assembled, the flat portion 13*a* of the hinge reinforcement 13 is stacked on the flat portion 12*a* of the outer reinforcement 12. Then, the flat portion 12*a* and the flat portion 13*a* are joined to each other by welding or the like. Further, the flange portions 12*c* and 12*c* of the outer reinforcement 12 are stacked on the flange portions 11*c* and 11*c* of the pillar inner 11, and the flange portions 12*c* and 12*c* are joined to the flange portions 11*c* and 11*c* by welding or the like.

Moreover, a locker (which is also referred to as a side sill) 2 and a roof side rail 3, which extend in the longitudinal direction of a vehicle, are disposed at positions adjacent to the lower and upper end portions of the center pillar 1, respectively.

A vulnerable portion A, of which the stiffness is lower than the stiffness of the upper portion and the middle portion of the center pillar 1, is formed at the lower portion of the center pillar 1, which is adjacent to the locker 2. A plurality of through holes 14, which passes through the side wall portion 12*b* of the outer reinforcement 12, is formed at the vulnerable portion A. These through holes 14 are formed at each of the pair of side wall portions 12*b* and 12*b* facing each other.

As shown in FIGS. 1 and 2, the through holes 14 are formed substantially at the middle positions of the side wall portion 12*b* of the outer reinforcement 12. These through holes 14 are disposed along the vertical direction.

Figure 4:
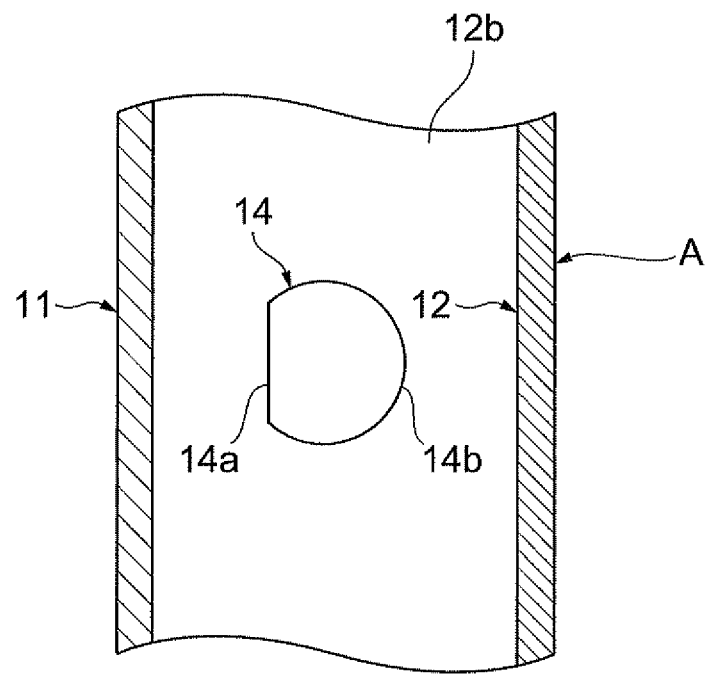
FIG. 4 is an enlarged view of a through hole.

FIG. 4 is an enlarged view of the through hole. As shown in FIG. 4, the through hole 14 is formed substantially in a D shape. The contour of the through hole 14 includes a linear portion 14*a* and a circular arc portion 14*b* that is connected to both ends of the linear portion 14*a*. Further, the circular arc portion 14*b* is formed so as to be longer than the linear portion 14*a*. The linear portion 14*a* is disposed close to the inside of a vehicle, and the circular arc portion 14*b* is disposed close to the outside of a vehicle.

When a load F is applied to the center pillar 1 having the above-mentioned structure by a side collision or the like as shown in FIG. 5, stress concentration occurs first at the vulnerable portion A of the center pillar 1. Accordingly, bending deformation occurs at the side wall portion 12*b* of the outer reinforcement 12 as shown by arrows M.

For this reason, compressive stress is generated on a portion of the outer reinforcement that is closer to the outside of a vehicle than a neutral axis L1, and tensile stress is generated on a portion of the outer reinforcement that is closer to the inside of a vehicle than the neutral axis L1. On the other hand, compressive stress is generated on a portion of the outer reinforcement that is closer to the outside of a vehicle than a neutral axis L2, and tensile stress is generated on a portion of the outer reinforcement that is closer to the inside of a vehicle than the neutral axis L2. Meanwhile, the neutral axes L1 and L2 are positions where a balance is kept between the tensile stress and the compressive stress in the cross-sectional shape of the portion 12*b* of the outer reinforcement 12.

Further, tensile stress is applied to the circular arc portion 14*b* and compressive stress is applied to the linear portion 14*a*, respectively, of the through hole 14. The linear portion 14*a* becomes a compressive side (shrunk side), and the circular arc portion 14*b* becomes a tensile side (stretched side). In FIG. 5, the shape shown by the broken line is the shape of the through hole 14 where the bending deformation has not yet occurred, and the shape shown by the solid line is the shape of the through hole 14 where the bending deformation has occurred.

In this case, since the circular arc portion 14*b* is formed in a circular arc shape and is longer than the linear portion 14*a*, tensile stress is not easily applied to the circular arc portion 14*b* and the circular arc portion 14*b* allows for deformation. Accordingly, it may be possible to control the deformation mode of a member. Further, since the tensile side (circular arc portion 14*b*) allows for deformation in length as described above, tensile stress is not easily applied to the circular arc portion. Accordingly, it may be possible to significantly reduce the compressive stress applied to the linear portion 14*a*. As a result, since the tensile stress applied to the flange portion 12*c* of the outer reinforcement 12 is significantly reduced in comparison with the vicinity of the through hole 14, it may be possible to suppress the occurrence of the fracturing of the center pillar 1 that is caused by a collision.

Meanwhile, the above-mentioned embodiment is an example of the structural member for a vehicle according to the invention. The structural member for a vehicle according to the invention is not limited to the structural member described in this embodiment. The structural member for a vehicle according to the invention may be a structural member that is obtained by modifying the structural member for a vehicle according to the embodiment without changing the scope described in each claim or applying the invention to another member.

For example, an example where the structural member for a vehicle is a center pillar has been described in the above-mentioned embodiment. However, the invention is not limited to a center pillar and may be applied to a structural member for a vehicle such as a side member.

The invention claimed is:

1. A structural member for a vehicle including a vulnerable portion where through holes are formed,
    wherein a tensile portion of the contour of the through hole, to which tensile stress is applied when a load is applied to the through hole, is longer than a compressive portion of the contour of the through hole to which compressive stress is applied when a load is applied to the through hole, and
    the compressive portion of the contour of the through hole is formed in a linear shape, and the tensile portion is formed in a circular arc shape.

2. The structural member for a vehicle according to claim 1,
    wherein the structural member is a center pillar extending in a vertical direction of a vehicle.

3. The structural member for a vehicle according to claim 2, wherein the load is a load from a lateral side of the vehicle.

4. The structural member for a vehicle according to claim 3,
wherein the center pillar comprises a pillar inner extending in a vertical direction and disposed on an inside of the vehicle and an outer reinforcement extending in the vertical direction and disposed on an outside of the vehicle,
the outer reinforcement includes a flat portion that forms an inner surface of the outer reinforcement and a pair of side wall portions that is connected to both ends of the flat portion, and
the through hole is formed at a lower portion of each of the pair of side wall portions.

* * * * *